United States Patent
Ebstyne et al.

(10) Patent No.: US 9,495,801 B2
(45) Date of Patent: Nov. 15, 2016

(54) POSE TRACKING AN AUGMENTED REALITY DEVICE

(71) Applicant: MICROSOFT TECHNOLOGY LICENSING, LLC, Redmond, WA (US)

(72) Inventors: Michael John Ebstyne, Seattle, WA (US); Frederik Schaffalitzky, Bellevue, WA (US); Drew Steedly, Redmond, WA (US); Calvin Chan, Issaquah, WA (US); Ethan Eade, Seattle, WA (US); Alex Kipman, Redmond, WA (US); Georg Klein, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 113 days.

(21) Appl. No.: 14/267,711

(22) Filed: May 1, 2014

(65) Prior Publication Data

US 2015/0317833 A1    Nov. 5, 2015

(51) Int. Cl.
| | |
|---|---|
| *G06T 19/00* | (2011.01) |
| *G06F 3/01* | (2006.01) |
| *G02B 27/01* | (2006.01) |
| *G06F 3/038* | (2013.01) |

(52) U.S. Cl.
CPC ........... *G06T 19/006* (2013.01); *G02B 27/017* (2013.01); *G06F 3/011* (2013.01); *G06F 3/012* (2013.01); *G06F 3/038* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 5,469,257 A | 11/1995 | Blake et al. | |
| 8,326,533 B2 | 12/2012 | Sachs et al. | |
| 2004/0073360 A1* | 4/2004 | Foxlin | G01C 21/16 |
| | | | 701/517 |

(Continued)

FOREIGN PATENT DOCUMENTS

| | | |
|---|---|---|
| WO | 2004059560 A2 | 7/2004 |
| WO | 2012115515 A1 | 8/2012 |

OTHER PUBLICATIONS

Klein "Visual tracking for Augmented Reality", A Phd thesis submitted in Jan. 2006.*

(Continued)

*Primary Examiner* — Yingchun He
(74) *Attorney, Agent, or Firm* — Dan Choi; Micky Minhas

(57) ABSTRACT

An augmented reality device including a plurality of sensors configured to output pose information indicating a pose of the augmented reality device. The augmented reality device further includes a band-agnostic filter and a band-specific filter. The band-specific filter includes an error correction algorithm configured to receive pose information as filtered by the band-agnostic filter and reduce a tracking error of the pose information in a selected frequency band. The augmented reality device further includes a display engine configured to position a virtual object on a see-through display as a function of the pose information as filtered by the band-agnostic filter and the band-specific filter.

18 Claims, 5 Drawing Sheets

(56) References Cited

U.S. PATENT DOCUMENTS

| | | |
|---|---|---|
| 2004/0149036 A1* | 8/2004 | Foxlin .................. A61B 5/1113 73/511 |
| 2010/0309474 A1 | 12/2010 | Kilic et al. |
| 2012/0116716 A1 | 5/2012 | Lokshin et al. |
| 2012/0134005 A1 | 5/2012 | Bergh |
| 2012/0259572 A1 | 10/2012 | Afzal et al. |
| 2013/0121367 A1 | 5/2013 | Ahuja et al. |
| 2013/0201291 A1 | 8/2013 | Liu et al. |
| 2013/0249784 A1 | 9/2013 | Gustafson et al. |

OTHER PUBLICATIONS

Azuma "Predictive Tracking for Augmented Reality", A dissertation submitted to the faculty of UNC Chapel Hill, 1995.*

ISA European Patent Office, International Search Report and Written Opinion Issued in Application No. PCT/US2015/027859, Jul. 9, 2015, WIPO, 10 pages.

Klein, Georg, "Visual Tracking for Augmented Reality", A Thesis Submitted for the Degree of Doctor of Philosophy, Jan. 2006, 193 pages.

Ayub, et al., "A Sensor Fusion Method for Smart phone Orientation Estimation", In Proceedings of the 13th Annual Post Graduate Symposium on the Convergence of Telecommunications, Networking and Broadcasting, Jun. 2012, 6 pages.

IPEA European Patent Office, Second Written Opinion Issued in Application No. PCT/US2015/027859, Apr. 19, 2016, WIPO, 6 Pages.

IPEA European Patent Office, International Preliminary Report on Patentability issued in PCT Application No. PCT/US2015/027859, Jul. 15, 2016, WIPO, 13 pages.

* cited by examiner

POSE TRACKING AN AUGMENTED REALITY DEVICE

BACKGROUND

Virtual reality systems exist for simulating virtual environments within which a user may be immersed. Displays such as head-up displays, head-mounted displays, etc., may be utilized to display the virtual environment. To maintain an immersive virtual experience, changes in a user's pose may be tracked and translated to the rendered virtual environment. In some cases, error in the pose tracking measurements may be translated to the virtual world, which may diminish the experience of the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

According to one aspect of this disclosure, an augmented reality device includes a plurality of sensors configured to output pose information indicating a pose of the augmented reality device. The augmented reality device further includes a band-agnostic filter and a band-specific filter. The band-specific filter includes an error correction algorithm configured to receive pose information as filtered by the band-agnostic filter. The band-specific filter is configured to reduce a tracking error of the pose information in a selected frequency band. The augmented reality device further includes a display engine configured to position a virtual object on a see-through display as a function of the pose information as filtered by the band-agnostic filter and the band-specific filter.

DETAILED DESCRIPTION

Virtual reality systems allow a user to become immersed in a simulated virtual environment. In order to deliver an immersive experience, the virtual environment may be displayed to the user via a head-mounted display (HMD). Furthermore, to enhance the experience, the HMD may change the user's virtual perspective as the user rotates her head. One form of virtual reality, known as augmented reality, allows the user to simultaneously view both real and virtual objects. As the head of an augmented reality user rotates, the user may expect the displayed virtual objects to move in relation to the motion of the head in order to maintain spatial relationships with real world objects seen through the head-mounted display.

The present disclosure describes stably tracking the pose of head-mounted, augmented reality display devices in three-dimensional world space. Also described is the positioning of virtual objects on the display as a function of the tracked pose of the HMD.

Figure 1:
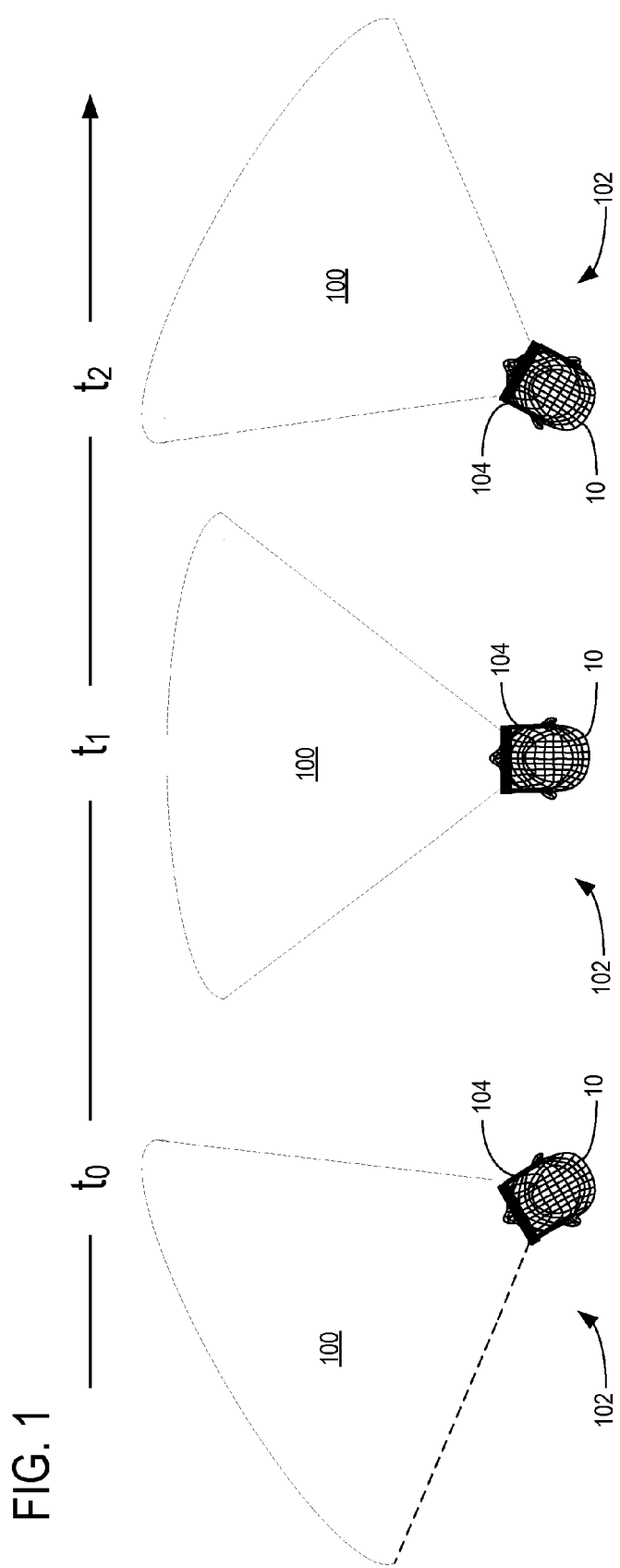
FIG. 1 shows a user rotating her head and field of view within a physical environment.
Figure 2:
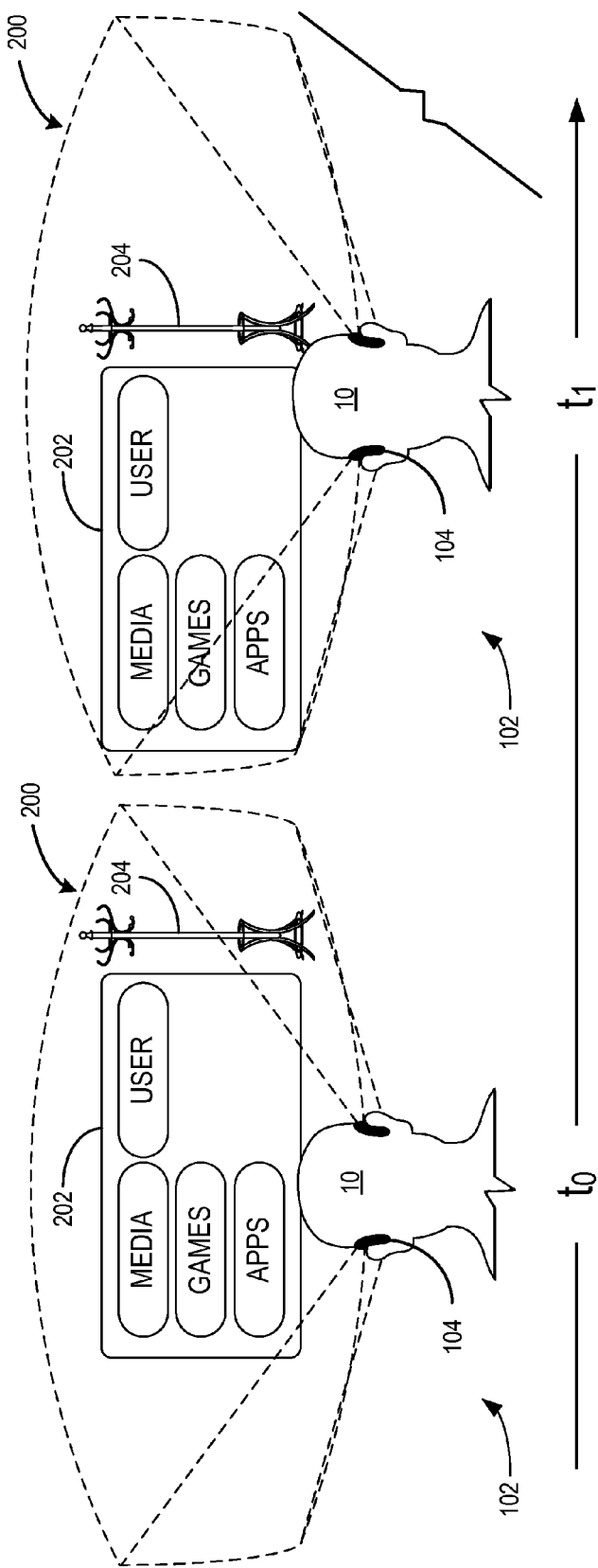
FIG. 2 shows an example augmented reality environment corresponding to the physical environment and rotation in FIG. 1.

FIG. 1 shows an illustrative example of a user 10 rotating her head and field of view 100. FIG. 2 shows an example augmented reality environment 200 that corresponds to the user's changing field of view in FIG. 1.

Referring first to FIG. 1, a user 10 begins with an initial pose (i.e., position and orientation) and field of view 100 at $t_0$. At $t_1$, user 10 rotates her head to a second pose and a third pose at $t_2$.

FIG. 1 also shows a computing system 102 which may allow user 10 to be immersed within an augmented reality environment. Computing system 102 may be used to play a variety of different games, play one or more different media types, and/or control or manipulate non-game applications and/or operating systems. Computing system 102 may include display device 104, which may be used to present game visuals, media content, and/or application visuals to user 10. As one example, display device 104 may be a HMD/wearable see-through display and may be configured to be used to present an augmented reality to user 10. The augmented reality environment may include both virtual objects that do not exist in the real world and physical objects that actually exist within the user's physical environment. For example, FIG. 2 shows an augmented reality environment 200 including a virtual application menu 202 and a real-world physical object 204. Computing system 102 will be discussed in greater detail with respect to FIG. 6.

Returning to the augmented reality environment of FIG. 2, virtual application menu 202 and physical object 204 are shown with an initial spatial relationship at to. As user 10 rotates her head to position $t_1$, the position of physical object 204 changes within the user's field of view. To maintain the augmented reality experience of user 10, display device 104 may track the change in pose of user 10. Pose information indicating the pose change may then be used by computing system 102 to instruct display device 104 to change the display of virtual application menu 202 within the augmented reality environment. As shown at $t_1$, the position of application menu 202 has been moved leftward to maintain the spatial relationship with physical object 204. In order to effect a smooth, leftward motion of application menu 202, computing system 102 may predict future poses of user 10 based upon the received pose information. Instructing display device 104 to change the display of virtual application menu 202 based on a predicted future pose of user 10 provides the advantage of minimizing any time lag between the change in position of virtual application menu 202 and the correlating change in pose of user 10.

Figure 3:
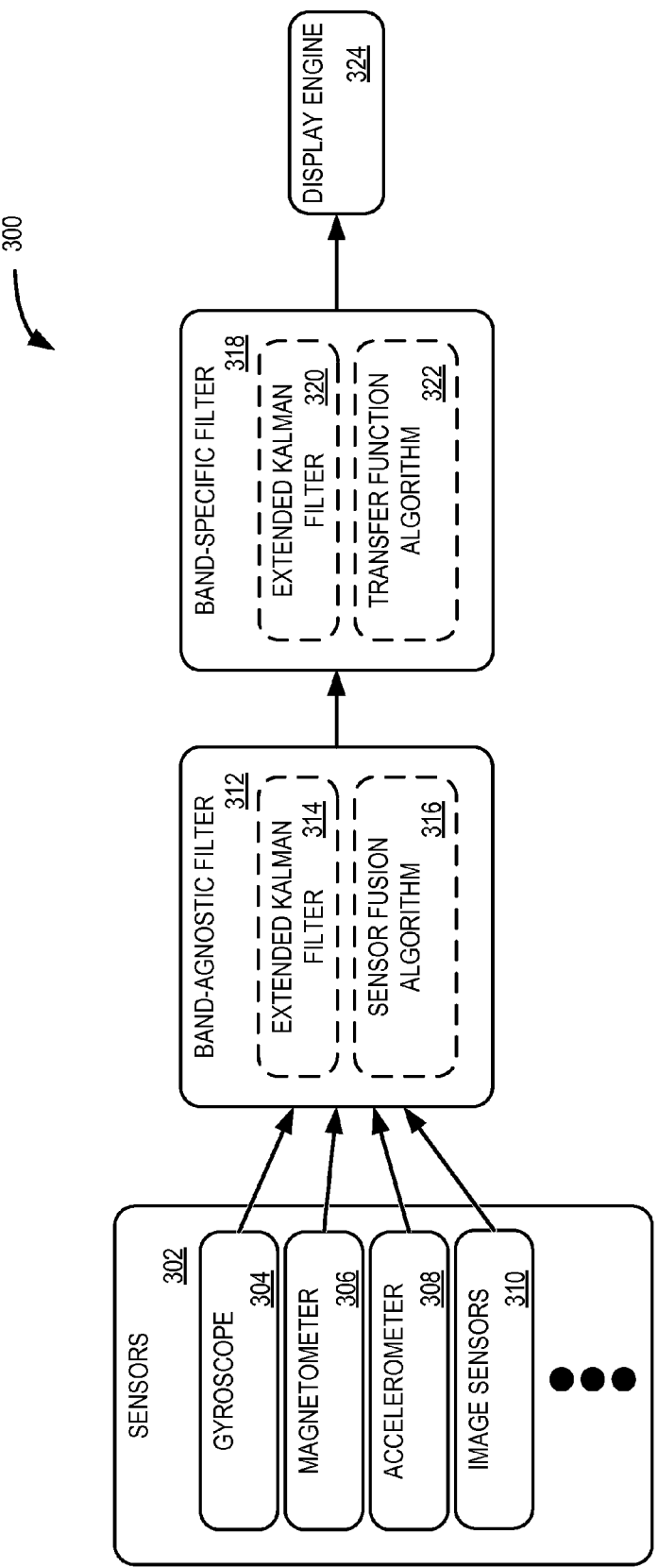
FIG. 3 schematically shows an illustrative example of an augmented reality device in accordance with an embodiment of the present disclosure.

FIG. 3 shows an illustrative example of an augmented reality device 300 in accordance with an embodiment of the present disclosure. Augmented reality device 300 may include a plurality of sensors 302 configured to output pose information indicating a pose of augmented reality device 300. The plurality of sensors 302 may include a gyroscope 304, a magnetometer 306, an accelerometer 308, an image sensor 310, and/or other suitable sensors.

Each sensor may track the pose of augmented reality device 300 and provide pose information, a sequential stream of estimated pose values over time, to band-agnostic filter 312. For example, gyroscope 304 may provide pose information relating to angular velocity of augmented reality device 300. Magnetometer 306 may provide pose information relating to a detected change in a magnetic field. Accelerometer 308 may provide pose information relating to detected acceleration relative to acceleration due to gravity. Image sensor 310 may provide pose information relating to detected changes between captured images. It will be understood that the list of sensors is non-limiting and may include any other suitable sensor capable of generating pose information.

The pose information provided by each sensor may include variability in the estimated pose values known as tracking error. Tracking error within the pose information may have one or more sources. For example, tracking error may be a function of the precision of the sensor. Another source of tracking error may include signal noise produced by electrical interference from external sources.

Tracking error may be characterized by a frequency band within the pose information. Furthermore, the frequency band of the tracking error may influence how the tracking error is perceived by a user of an augmented reality device. For example, tracking error in a relatively high frequency band (e.g., greater than 100 Hz) may be perceived by a user as blurring of a displayed virtual object. Tracking error within a relatively intermediate frequency band may be perceived as random tremors of a virtual object known as jitter. Tracking error within a relatively low frequency band (e.g., less than 0.5 Hz) may be perceived as drift, or an increasing error in the display placement of a virtual object over time. Tracking error in other frequency bands may result in other effects that may diminish the augmented reality experience of the user.

To correct for tracking error, augmented reality device 300 may include high precision/low noise sensors to minimize the tracking error of the pose information provided by each sensor. Additionally, augmented reality device 300 includes band-agnostic filter 312 and band-specific filter 318 to reduce the tracking error within the pose information provided to display engine 324.

It will be appreciated that the pose information as filtered by band-agnostic filter 312 and band-specific filter 318 may include pose information indicating one or more predicted future poses of augmented reality device 300.

Band-agnostic filter 312 may be configured to receive pose information from each of the plurality of sensors and process the pose information to reduce an all-band tracking error of the pose information. Band-agnostic filter 312 may process the sequential series of estimated pose values from each of the plurality of sensors to generate an output stream of pose information. In this case, band-agnostic filter 312 estimates each pose value within the output pose information from the estimated pose values received from the sensors. Thus each pose value estimated by band-agnostic filter 312 may include less tracking error than the estimated pose value generated by the plurality of sensors. Another example of a method of reducing error across all frequency bands is processing the pose information such that a root-mean-square (RMS) of the tracking error of the pose information is reduced. In both examples described above, band-agnostic filter 312 includes a regression method of minimizing the total error of the pose information.

Band-agnostic filter 312 may optionally use an Extended Kalman filter 314 or any other suitable error correction algorithm that may be configured to filter the pose information and minimize or reduce an all-band tracking error of the pose information.

As discussed above, each of the plurality of sensors 302 may provide a separate measurement of the pose of augmented reality device 300. As such, band-agnostic filter 312 may utilize a sensor fusion algorithm to combine the pose information from each of the plurality of sensors and reduce the all-band tracking error of the combined pose information.

Band-specific filter 318 may be configured to receive pose information filtered by band-agnostic filter 312, and process the pose information to reduce a tracking error of the pose information in a selected frequency band. Band-specific filter 318 may use an Extended Kalman filter 320 or any other error correction algorithm configured to reduce the tracking error of the pose information within the selected frequency band. As an example, band-specific filter may include a transfer function algorithm 322. Transfer function algorithm 322 may be configured to receive pose information as filtered by the band-agnostic filter and process the pose information such that the tracking error of the pose information is translated or "transferred" from a time domain to a frequency domain. Transfer function algorithm 322 may then reduce the tracking error of the pose information in the selected frequency band.

As another example, band-specific filter 318 may include an error correction algorithm that uses a time constant to define the selected frequency band. In this example, a time constant (tau) may be used to select the frequency band in which the tracking error of the pose information may be reduced.

As a non-limiting example, band-specific filter 318 may be configured such that the output pose information has tracking error reduced in a relatively high frequency band to reduce blurring of displayed virtual objects. Alternatively, band-specific filter may be configured to reduce tracking error in a relatively low frequency band to reduce drift. It will be appreciated that the band-specific filter may be configured to reduce tracking error within the pose information in any other frequency band of interest.

The use of band-agnostic filter 312 and band-specific filter 318 to filter the pose information provides several advantages. Specifically, the reduction of tracking error across all frequency bands by band-agnostic filter 312 allows band-specific filter 318 to minimize tracking error in a specific frequency band without overly distorting the tracking error within other frequency bands. Furthermore, this two-stage method of filtering tracking error reduces the computational load required to process the pose information.

FIG. 3 also includes a display engine 324. Display engine 324 may be configured to receive filtered pose information from band-specific filter 318 and position a virtual object on a display as a function of the pose information as filtered by band-agnostic filter 312 and band-specific filter 318. Furthermore, display engine 324 may be configured to position a virtual object on a see-through display such that a perceived positional difference between the virtual object and a real-world object viewed through the see-though display is filtered in a specified frequency band It will be appreciated that band-agnostic filter 312 and band-specific filter 318 may be incorporated into display engine 324.

The two stage filtering approach may be used with a variety of different sensors over a variety of different dimensions.

Figure 4:
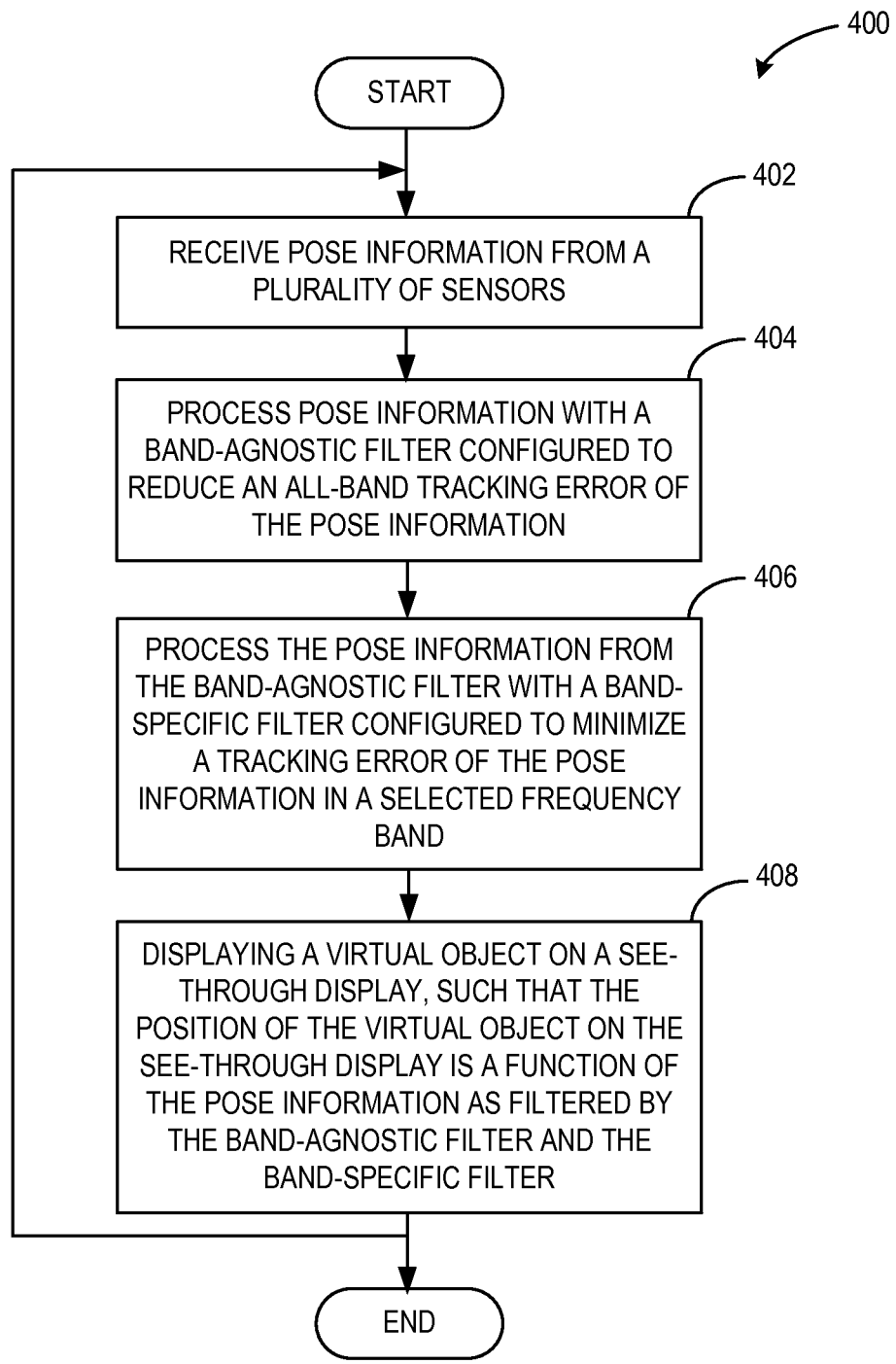
FIG. 4 shows a method of presenting an augmented reality environment in accordance with an embodiment of the present disclosure.

FIG. 4 illustrates an example method 400 for displaying an augmented reality environment. At 402, method 400 includes receiving pose information from a plurality of sensors. For example, pose information indicating the pose of the augmented reality device/HMD may be obtained from one or more gyroscope, accelerometer, magnetometer, visual sensor, and/or other suitable sensor.

At 404, method 400 includes processing the pose information with a band-agnostic filter configured to reduce an all-band tracking error of the pose information. As a non-limiting example, the band-agnostic filter receives pose information from each of the plurality of sensors and reduces a root-mean-square error within the output pose information.

At 406, method 400 includes processing the pose information from the band-agnostic filter with a band-specific filter configured to reduce a tracking error of the pose information in a selected frequency band. At 408, method 400 includes displaying a virtual object on a see-through display, such that the position of the virtual object on the see-through display is a function of the pose information as filtered by the band-agnostic filter and the band-specific filter.

Furthermore, method 400 may continuously receive and process pose information in real-time. Thus, method 400 may continuously maintain accurate representations of displayed virtual objects with respect to the user's pose.

It will be further appreciated that method 400 may apply to any number of displayed virtual elements. Thus, method 400 may maintain accurate representations of displayed virtual objects with respect the user's pose in both augmented reality and completely virtual environments.

Figure 5:
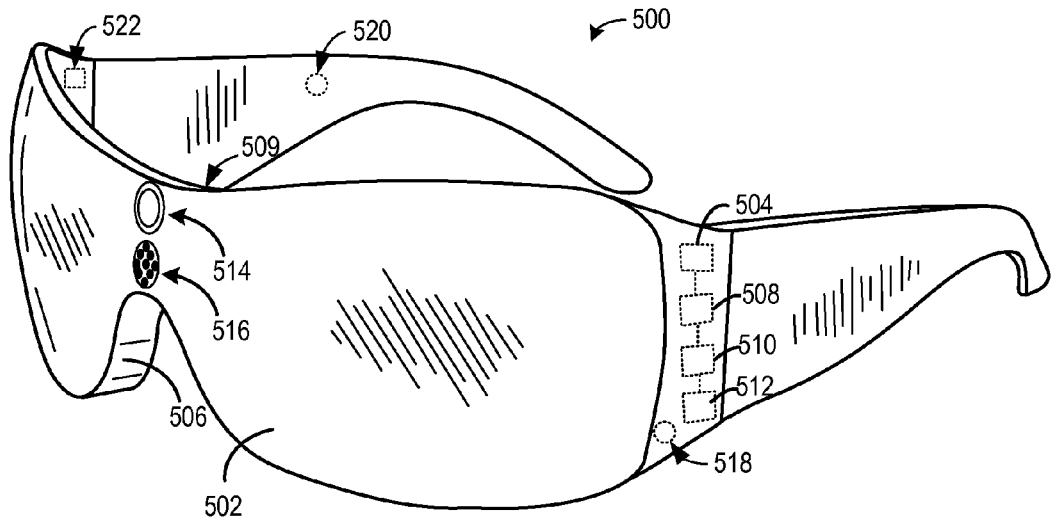
FIG. 5 schematically shows an example head-mounted display in accordance with an embodiment of the present disclosure.

With reference now to FIG. 5, one example of an HMD device 500 in the form of a pair of wearable glasses with a transparent display 502 is provided. It will be appreciated that in other examples, the HMD device 500 may take other suitable forms in which a transparent, semi-transparent, and/or non-transparent display is supported in front of a viewer's eye or eyes. It will also be appreciated that the HMD device 104 shown in FIG. 1 may take the form of the HMD device 500, as described in more detail below, or any other suitable HMD device.

The HMD device 500 includes a display system 504 and transparent display 502 that enables images such as holographic objects to be delivered to the eyes of a wearer of the HMD. The transparent display 502 may be configured to visually augment an appearance of a physical environment to a wearer viewing the physical environment through the transparent display. For example, the appearance of the physical environment may be augmented by graphical content (e.g., one or more pixels each having a respective color and brightness) that is presented via the transparent display 502 to create an augmented reality environment. As another example, transparent display 502 may be configured to render a fully opaque virtual environment.

The transparent display 502 may also be configured to enable a user to view a physical, real-world object in the physical environment through one or more partially transparent pixels that are displaying a virtual object representation. As shown in FIG. 5, in one example the transparent display 502 may include image-producing elements located within lenses 506 (such as, for example, a see-through Organic Light-Emitting Diode (OLED) display). As another example, the transparent display 502 may include a light modulator on an edge of the lenses 506. In this example the lenses 506 may serve as a light guide for delivering light from the light modulator to the eyes of a user. Such a light guide may enable a user to perceive a 3D holographic image located within the physical environment that the user is viewing, while also allowing the user to view physical objects in the physical environment, thus creating an augmented reality environment.

The HMD device 500 may also include various sensors and related systems. For example, the HMD device 500 may include a gaze tracking system 508 that includes one or more image sensors configured to acquire image data in the form of gaze tracking data from a user's eyes. Provided the user has consented to the acquisition and use of this information, the gaze tracking system 508 may use this information to track a position and/or movement of the user's eyes.

In one example, the gaze tracking system 508 includes a gaze detection subsystem configured to detect a direction of gaze of each eye of a user. The gaze detection subsystem may be configured to determine gaze directions of each of a user's eyes in any suitable manner. For example, the gaze detection subsystem may comprise one or more light sources, such as infrared light sources, configured to cause a glint of light to reflect from the cornea of each eye of a user. One or more image sensors may then be configured to capture an image of the user's eyes.

Images of the glints and of the pupils as determined from image data gathered from the image sensors may be used to determine an optical axis of each eye. Using this information, the gaze tracking system 508 may then determine a direction the user is gazing. The gaze tracking system 508 may additionally or alternatively determine at what physical or virtual object the user is gazing. Such gaze tracking data may then be provided to the HMD device 500.

It will also be understood that the gaze tracking system 508 may have any suitable number and arrangement of light sources and image sensors. For example and with reference to FIG. 5, the gaze tracking system 508 of the HMD device 500 may utilize at least one inward facing sensor 509.

The HMD device 500 may also include sensor systems that receive physical environment data from the physical environment. For example, the HMD device 500 may also include a head tracking system 510 that utilizes one or more motion sensors, such as motion sensors 512 on HMD device 500, to capture head pose data and thereby enable position tracking, direction and orientation sensing, and/or motion detection of the user's head. Accordingly and as described in more detail above, the band-agnostic filter 312 of FIG. 3 may receive head pose data as sensor information that enables the pose of the HMD device 500 to be estimated.

In one example, head tracking system 510 may comprise an inertial measurement unit configured as a three-axis or three-degree of freedom position sensor system. This example position sensor system may, for example, include three gyroscopes to indicate or measure a change in orientation of the HMD device 500 within 3D space about three orthogonal axes (e.g., x, y, z) (e.g., roll, pitch, yaw). In another example, head tracking system 510 may comprise an inertial measurement unit configured as a six-axis or six-degree of freedom position sensor system. This example position sensor system may, for example, include three accelerometers and three gyroscopes to indicate or measure a change in location of the HMD device 500 along the three orthogonal axes and a change in device orientation about the three orthogonal axes.

Head tracking system 510 may also support other suitable positioning techniques, such as GPS or other global navigation systems. Further, while specific examples of position sensor systems have been described, it will be appreciated that any other suitable position sensor systems may be used. For example, head pose and/or movement data may be determined based on sensor information from any combination of sensors mounted on the wearer and/or external to the wearer including but not limited to any number of gyroscopes, accelerometers, inertial measurement units (IMUs), GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

In some examples the HMD device 500 may also include an optical sensor system that utilizes one or more outward facing sensors, such as optical sensor 514 on HMD device 500, to capture image data. The outward facing sensor(s) may detect movements within its field of view, such as gesture-based inputs or other movements performed by a user or by a person or physical object within the field of view. The outward facing sensor(s) may also capture 2D image information and depth information from the physical environment and physical objects within the environment. For example, the outward facing sensor(s) may include a depth camera, a visible light camera, an infrared light camera, and/or a position tracking camera.

The optical sensor system may include a depth tracking system that generates depth tracking data via one or more depth cameras. In one example, each depth camera may include left and right cameras of a stereoscopic vision system. Time-resolved images from one or more of these depth cameras may be registered to each other and/or to images from another optical sensor such as a visible spectrum camera, and may be combined to yield depth-resolved video.

In other examples a structured light depth camera may be configured to project a structured infrared illumination, and to image the illumination reflected from a scene onto which the illumination is projected. A depth map of the scene may be constructed based on spacings between adjacent features in the various regions of an imaged scene. In still other examples, a depth camera may take the form of a time-of-flight depth camera configured to project a pulsed infrared illumination onto a scene and detect the illumination reflected from the scene. For example, illumination may be provided by an infrared light source 516. It will be appreciated that any other suitable depth camera may be used within the scope of the present disclosure.

The outward facing sensor(s) may capture images of the physical environment in which a user is situated. With respect to the HMD device 500, in one example a mixed reality display program may include a 3D modeling system that uses such captured images to generate a virtual environment that models the physical environment surrounding the user.

The HMD device 500 may also include a microphone system that includes one or more microphones, such as microphone 518 on HMD device 500, that capture audio data. In other examples, audio may be presented to the user via one or more speakers, such as speaker 520 on the HMD device 500.

The HMD device 500 may also include a controller, such as controller 522 on the HMD device 500. The controller may include a logic machine and a storage machine, as discussed in more detail below with respect to FIG. 6, that are in communication with the various sensors and systems of the HMD device and display. In one example, the storage subsystem may include instructions that are executable by the logic subsystem to receive signal inputs from the sensors, determine a pose of the HMD device 500, and adjust display properties for content displayed on the transparent display 502.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
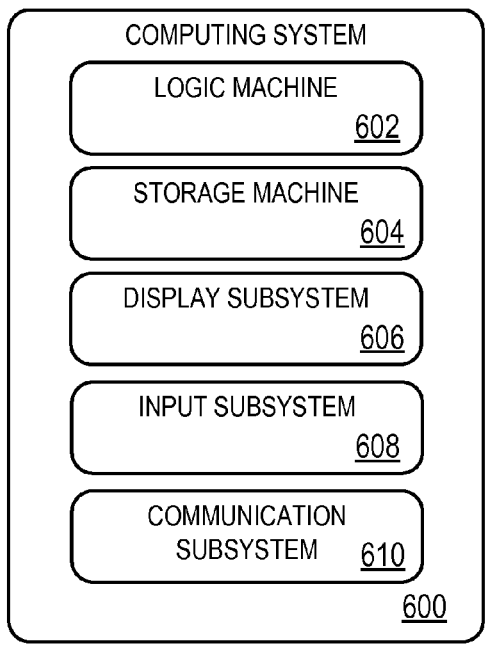
FIG. 6 schematically shows a computing system in accordance with an embodiment of the present disclosure.

FIG. 6 schematically shows a non-limiting embodiment of a computing system 600 that can enact one or more of the methods and processes described above. Computing system 600 is shown in simplified form. Computing system 600 may take the form of one or more head-mounted display devices, or one or more devices cooperating with a head-mounted display device (e.g., personal computers, server computers, tablet computers, home-entertainment computers, network computing devices, gaming devices, mobile computing devices, mobile communication devices (e.g., smart phone), and/or other computing devices).

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold machine-readable instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 602 executing instructions held by storage machine 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology, such as displays 502 of the HMD 500 illustrated in FIG. 5. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; electric-field sensing componentry for assessing brain activity; any of the sensors described above with respect to head tracking system 510 of FIG. 5; and/or any other suitable sensor.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An augmented reality device, comprising:
   a plurality of sensors configured to output pose information indicating a pose of the augmented reality device;
   a band-agnostic filter configured to receive pose information from the plurality of sensors and to reduce an all-band tracking error characterized by an entire frequency band of the pose information;
   a band-specific filter configured to receive pose information as filtered by the band-agnostic filter, the band-specific filter configured to reduce a tracking error of the pose information in a selected frequency band that is less than the entire frequency band; and
   a display engine configured to position a virtual object on a see-through display as a function of the pose information as filtered by the band-agnostic filter and the band-specific filter.

2. The augmented reality device of claim 1, wherein the plurality of sensors include one or more of a gyroscope, a magnetometer, an accelerometer, and an image sensor.

3. The augmented reality device of claim 1, wherein the band-agnostic filter uses a sensor fusion algorithm configured to:
   receive the pose information from each of the plurality of sensors;
   combine the pose information from each of the plurality of sensors; and
   reduce the all-band tracking error of the combined pose information.

4. The sensor fusion algorithm of claim 3, wherein the sensor fusion algorithm is configured to reduce a root-mean-square tracking error of the pose information.

5. The augmented reality device of claim 1, wherein the band-agnostic filter uses an Extended Kalman filter.

6. The augmented reality device of claim 1, wherein the band-specific filter uses a transfer function algorithm configured to:
   receive pose information as filtered by the band-agnostic filter;
   transfer the tracking error of the received pose information of the pose information from a time domain to a frequency domain; and
   reduce the tracking error of the pose information within the selected frequency band.

7. The augmented reality device of claim 1, wherein the band-specific filter uses an Extended Kalman filter.

8. The augmented reality device of claim 1, wherein the band-specific filter uses a time constant to define the selected frequency band.

9. A method of augmented reality comprising:
receiving pose information from a plurality of sensors;
processing the pose information with a band-agnostic filter configured to reduce an all-band tracking error characterized by an entire frequency band of the pose information;
processing the pose information from the band-agnostic filter with a band-specific filter configured to reduce a tracking error of the pose information in a selected frequency band that is less than the entire frequency band; and
displaying a virtual object on a see-through display, such that the position of the virtual object on the see-through display is a function of the pose information as filtered by the band-agnostic filter and the band-specific filter.

10. The method of augmented reality of claim 9, wherein the band-agnostic filter includes a sensor fusion algorithm configured to:
receive the pose information from each of the plurality of sensors;
combine the pose information from each of the plurality of sensors; and
reduce the all-band tracking error of the combined pose information.

11. The method of claim 10, wherein the sensor fusion algorithm is configured to reduce a root-mean-square tracking error of the pose information.

12. The method of augmented reality of claim 9, wherein the band-agnostic filter includes an Extended Kalman filter.

13. The method of augmented reality of claim 9, wherein the band-specific filter includes a transfer function algorithm configured to:
receive pose information as filtered by the band-agnostic filter;
transfer the tracking error of the pose information from a time domain to a frequency domain; and
reduce the tracking error of the pose information within the selected frequency band.

14. The method of augmented reality of claim 9, wherein the band-specific filter includes an Extended Kalman filter.

15. The method of augmented reality of claim 9, wherein the band-specific filter includes an error correction algorithm uses a time constant to define the selected frequency band.

16. A head-mounted display device comprising:
a wearable see-through display;
a plurality of sensors configured to output pose information indicating a tracked pose of the head-mounted display device; and
a display engine configured to position a virtual object on a see-through display as a function of the tracked pose of the head-mounted display device such that a perceived positional difference between the virtual object and a real-world object viewed through the see-though display is filtered by a two stage filter including a band-agnostic filter configured to reduce an all-band tracking error characterized by an entire frequency band of the pose information and a band-specific filter configured to receive filtered pose information from the band-agnostic filter and reduce a tracking error of the filtered pose information in a specified frequency band that is less than the entire frequency band.

17. The head-mounted display device of claim 16, wherein the display engine uses a first, band-agnostic Extended Kalman filter and a second, band-specific Extended Kalman filter.

18. The head-mounted display device of claim 16, wherein the plurality of sensors include one or more of a gyroscope, a magnetometer, an accelerometer, and an image sensor.

* * * * *